May 5, 1964 L. J. TWIBELL 3,131,751
CIRCULATION LINE AND SIDE STREAM FILTER FUEL SYSTEM
Filed Sept. 23, 1959
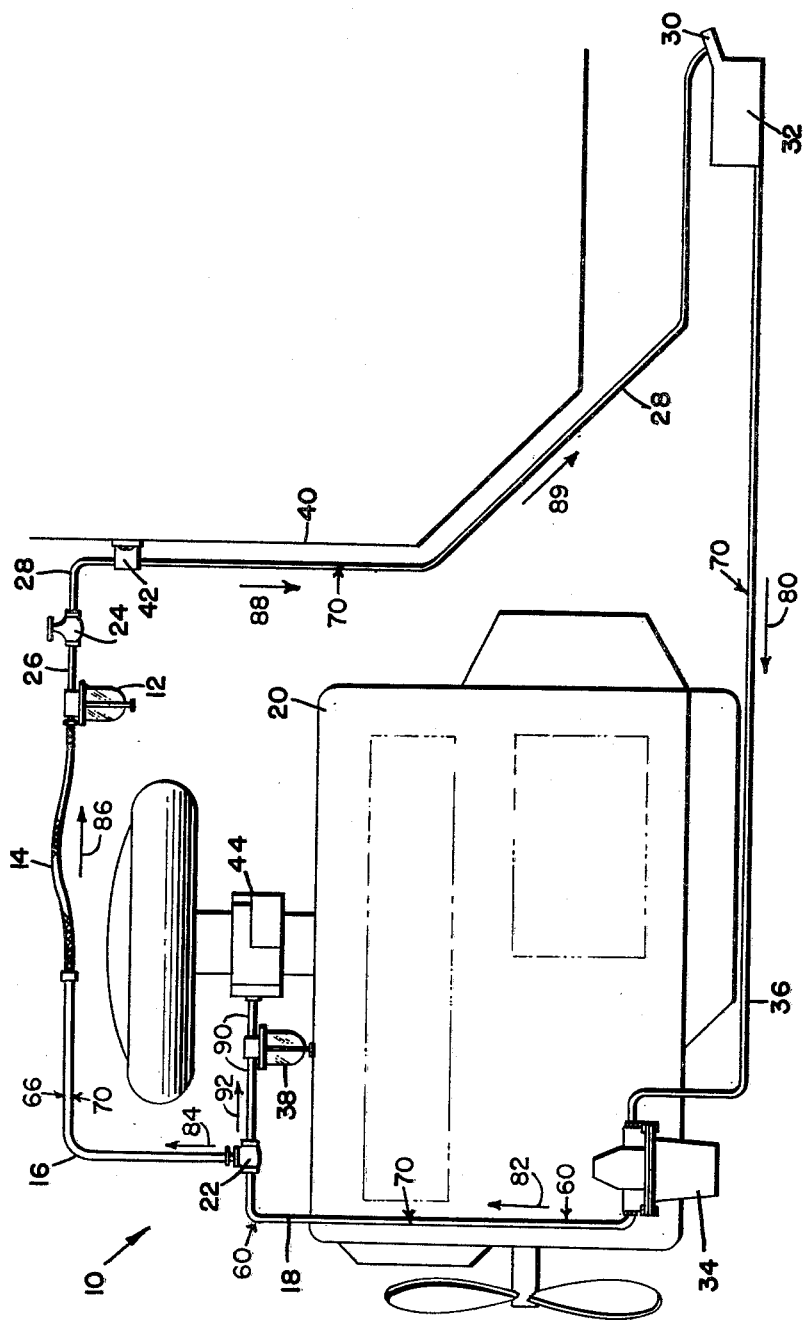
INVENTOR.
LLOYD J. TWIBELL
BY

United States Patent Office 3,131,751
Patented May 5, 1964

3,131,751
CIRCULATION LINE AND SIDE STREAM FILTER FUEL SYSTEM
Lloyd J. Twibell, Orchard, Nebr.
Filed Sept. 23, 1963, Ser. No. 310,695
11 Claims. (Cl. 158—36.4)

This invention relates to fuel systems of the type having a by-pass line leading to a fuel tank from the carburetor area to form constant circulation of fuel to and from the fuel tank whereby at some point in said circulation, a circulating filter can be inserted to provide for the continuous filtering of fuel.

As heretofore conceived such systems have had many disadvantages. The chief among these disadvantages has been in that two filters have been used in the circulation line heretofore, but these two filters have been used in such a way that they are both in the circulation line, whereas their effect is merely additive in the reducing of impurities in the circulation line.

An example of this is to be found in the Patent #2,795,269, issued June 11, 1957, to L. L. Witte and titled: Fueling System for an Internal Combustion Engine.

In this patent, two filtering devices are provided, neither one of which is disposed in a line leading from a circulating fuel line to a carburetor.

It is, therefore, an object of this invention to provide a fuel system of the type described in which the carburetor protection filter is disposed in a line leading from a fuel constant circulation line to the carburetor, whereby the stand-by filter is not directly in the fuel circulation line, to the end that the main load of filtering is carried on by a filter in the main circulation line, so that the carburetor protection filter becomes merely a stand-by filter receiving through it a far lesser amount of fuel flow than the fuel flow in the circulation line, whereby the carburetor protection filter is normally relatively clean and is likely only to become clogged when and if an operator fails to empty a main circulating fuel line filter.

It is an object of this invention to provide for flow through the circulating fuel line to pass closely by the entrance to the fuel tank filter pipe, whereby a motorist can look through the filter pipe and visually determine whether there is normal flow into the fuel tank from the by-pass line, whereby if the fuel flow has been shut off or been considerably impeded by impurities, he is warned that it is time for him to clean out his circulation line filter to replace his system in normal operating order. It will not be necessary at such times for the operator to bother to clean out his stand-by filter at the carburetor, however, because the main load of filtering is done in the circulating fuel line filter because the fuel flow therethrough is constant and of a much greater volume than is the fuel flow through the stand-by carburetor filter and to the engine.

A second major disadvantage of constant circulation filter-systems as described has been the greater frequency of clogging that can occur if there are two filters to be carefully watched instead of one filter. The human error involved in watching two filters increases the frequency of the clogging of the carburetor float valve with iron oxide or other fuel impurities, to the end that an engine can stop running because the rust or iron oxide particles get under the float valve preventing it from seating, and thereby causing the engine to be flooded. A still more frequent failure of a carburetor from clogging occurs when a car will not start because of excess flooding due to this same problem of a carburetor valve being held open by rust.

Much of the difficulty in starting automobiles in both summer and winter has been actually caused by rust and other impurities in fuel, the rust, coming from transportation and storage facilities, such as the storage tank at a filling station, the latter facilities normally not being coated to protect them against oxidation, although the fuel tank in an automobile is normally coated.

Some motorists have thought that the filter commonly disposed in front of a carburetor will protect the carburetor adquately. Experts have long recognized that this is not the case.

People have long desired that it would be possible and practical to place extra filters in the fuel line between the tank and carburetor. This has not been practical, however, because such extra filters, when clogged, shut off fuel to the engine, whereby an automobile might stop in the midde of a desert or in the middle of a dangerous traffic condition.

It is, therefore, an object of this invention to provide clean fuel flow to the carburetor without impeding flow by clogged filter and achieving this through providing the main load of filtering at a circulating fuel line filter disposed in a circulating fuel line, and preferably in a by-pass line portion of the circulating fuel line, whereby a clogging of the circulating fuel line filter will not interrupt fuel flow to the carburetor, whereby upon clogging of the circulating fuel line filter, a car can continue to operate without danger of being stopped in a desert or dangerous traffic condition.

A further object is to provide a motorist with absolute assurance that his stand-by filter at his carburetor will never become clogged so long as he takes the precaution of inspecting his filler pipe to see if flow from his by-pass line indicates cleaning of his circulating line filter, provided he then properly cleans the circulating line filter.

A further major disadvantage of by-pass line filter systems of the prior art has been in the presence of a spring-loaded valve in the by-pass line forming a constriction. Such spring-loaded valves are adapted to open during operating flow of fuel. However, when the fuel pump is shut off, they tend to close, thereby blocking the by-pass fuel line. This blocking creates a great disadvantage because of its effect in combination with the diaphragm spring of the fuel pump. Even after a fuel pump has been shut off, its diaphragm spring tends to continue to create a pressure against fuel in the line leading to the carburetor. With my system of this invention, this pressure causes no harm because it is dissipated harmlessly through the open by-pass line of my system, this disipation occurring immediately as soon as the motor stops. However, in systems of the prior art, dissipation of the diaphragm spring initiated pressure on the fuel cannot be dissipated through the by-pass line because of the aforesaid spring-loaded valve which closes and clogs the by-pass line, whereby the pressure in the line leading to the carburetor causes gasoline to be forced into the carburetor, to the end that cylinder wall lubrication becomes excessively diluted and washed away whereby motor starting is seriously hampered and rapid wear through inadequate lubrication reduces motor life.

It is, therefore, an object of this invention to provide a system as described with a by-pass fuel line which is constanly open so that when it is free of impurities, or substantially free of impurities, my by-pass line maintains an amount of frictional resistance to fuel flow which is vastly lesser than the resistance present when a spring-loaded valve is closed, whereby my constantly open by-pass line freely dissipates gasoline pressure after an engine has stopped whereby cylinder wall lubrication is not diluted and washed away.

In the above objectives, I have discussed the comparative relationship between my system and other by-pass line constant recirculation of fuel systems. Let me say that before the public marketing of my invention, there was never, to my knowledge, any by-pass line filtering system on the market. For that reason, it has seemed to me reasonable to assume that even though one such system has been previously described in the above-mentioned patent to L. L. Witte, yet there never has been any widely successful marketing of any by-pass line gasoline recirculation systems.

As regards those fuel systems that have been widely marketed, before public exposure of my invention, all of those systems have been subject to the clogging of the carburetor float valve problems above described, vapor lock problems which I will now discuss, and excessive fuel pressure problems which my system also solves as I will describe.

Fuel systems previously widely marketed have been without any way for vapor to escape. It is an object of this invention, therefore, to provide a by-pass line leading back to the fuel tank which gives the advantage of the dissipation of vapors through the by-pass line to the fuel tank. As all fuel tanks have a conventional vent pipe for vapor and to admit air, the vapor escapes from the automobile harmlessly. For this reason, I believe it is fair to say that my system has provided the most practical solution to vapor lock heretofore achieved.

The problem of excessive fuel pressure has long been recognized as one of the major unsolved problems of modern carburetion. Most fuel pumps deliver excessive pressure. The average fuel pump of a full size automobile manufactured in the United States has a pressure of from 4–7 pounds, when new. However, when such a fuel pump is old, and long before the same automobile is put out of service, its fuel pump will have a stretched diaphragm and its pumping pressure will, by that time, be greatly reduced even as low as two and three pounds, later even less.

For this reason, most manufacturers install fuel pumps on their new automobiles which are of pumping capacity greatly in excess of engine requirement, as leads to excess fuel pressure problems.

Such excess fuel pressure problems are firstly and foremost an excessively rich gasoline mixture proportional to the air available, to the end that fuel is wasted and power is lost. A gasoline-air explosion is similar to a bonfire in that an excess of fuel suddenly dumped onto a fire without sufficient air results in a smothering of the explosion to a degree proportional to the excess of gasoline, in my opinion.

An automobile which is receiving an excessively rich fuel mixture will run roughly. Such an automobile will not respond to acceleration properly. It will not respond smoothly. It will even have an unpleasant sound.

Excessive fuel pressure is especially bad in an automobile that has rust and other sediment in its fuel. When even a small amount of sediment is holding a carburetor float valve open, the excess pressure can push a great and harmful amount of gasoline through the carburetor and into the engine far beyond what is needed for sufficient carburation, whereby maximum power is not achieved, fuel is wasted, acceleration is sluggish, and idling is rough.

Excessively rich mixture also dilutes cylinder wall lubrication, bringing about lesser motor life.

The black smoke that comes from an exhaust pipe as a result of excessive fuel in the mixture causes increased air pollution which is the major problem in most urban areas and in particularly the lower west coast where this is a major cause of smog.

A further object of the invention is to provide a circulating fuel system which is adapted to preserve the life of a fuel pump to reduce the problems which ensue from the loss of pumping power as a fuel pump becomes worn out, this being accomplished through the provision of a by-pass line to the fuel tank for relieving pressure, whereby a fuel pump does not need to pump as hard as it pumps against the substantially more closed line that normally leads from fuel pump through the carburetor. More particularly, the by-pass line provides a more constant pressure at the carburetor regardless of the amount of pumping pressure inasmuch as the pressure at the carburetor can be regulated by a manually controlled valve in the by-pass line, whereby when a pump is new and pumping strongly, the manually controlled valve can be opened more widely which gives desired pressure at the carburetor, but which also by-passes a greater volume of fuel creating a lesser back pressure on the pump, thereby improving life of the fuel pump.

A further object is to provide a system as described in the use of which the by-pass fuel line provides sufficient frictional resistance to fuel flow therethrough to provide in cooperation with the fuel pump a sufficient operating fuel pressure against the carburetor whereby it is not necessary to have a reservoir in the by-pass line. Such a reservoir is shown in the above-mentioned patent to Witte. By this means, I provide for the absence of a reservoir so that there is no substantialy quantity of gasoline to flow down from any portions of my by-pass line which might be disposed above the carburetor so that there is no substantial quantity of gasoline flowing down from the by-pass line into the carburetor when the pump and engine have stopped, whereby the maximum preservation of lubrication in the engine and the cylinder walls is preserved. Also, for this reason, it is an object to provide any portions of the by-pass line which might be disposed above the carburetor with a minimum of internal volume so that the by-pass lines themselves do not contain a substantial quantity of gasoline to flow down to the carburetor after the engine and pump have stopped.

This application is a continuation-in-part of the applicant's co-pending patent application Serial No. 6,707, filed February 4, 1960, titled Circulating Double Filter Fuel System, and now abandoned.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

The drawing shows a longitudinal sectional view through the forward portion of a motor vehicle with an additional filter or sediment eliminator connected by a tube to the fuel line of the vehicle and to the neck of the fuel tank of the vehicle by a fuel return tube having a control valve therein.

In the accompanying drawing, and in the following specification, the same reference characters are used to designate the same parts and elements throughout, and in which the numeral 10 refers to the invention in its entirety, numeral 12 indicating a second filter connected by a flexible hose 14 to a tube 16, and the tube 16 is connected to the fuel line 18 of the engine 20 by an inverted T 22. The second filter 12 is connected to a control valve 24 by a tube 26 and the valve 24 is connected by a tube 28 to the neck 30 of a fuel tank 32.

The fuel line 18 extends from a fuel pump 34 and the intake of the pump is connected by a tube 36 to the tank 32. The fuel line 18 is provided with a first filter 38 which is conventional.

The fuel pump 34 is of a conventional type having a spring loaded diaphragm which has a tendency to seek its normal relaxed position after pumping has stopped, this tendency tending to force fuel through the line 18 into the carburetor and engine causing dilution of cylinder wall lubrication and washing away thereof as is a common problem with this type of conventional fuel pump. This problem is solved by dissipation of such pressure through the by-pass line of my invention back to the fuel tank.

The tube 36 can also be called the post-tank first fuel line 36 connecting the suction side of the fuel pump 34 with the bottom of the fuel tank 32.

The return line 28 is secured to the upper portion of the fire wall 40 of the vehicle by a bracket 42 which is positioned as close to the upper end of the fire wall as possible.

With the second filter 12 positioned in the discharge line 18 of the pump 34 fuel circulated through the return line 28 is continuously filtered, and as the fuel passes into the carburetor 44 it is filtered a second time by the first filter 38. With all rust and other foreign matter continuously filtered from the fuel, smooth easy running of the engine is assured, and greater mileage is obtained from the fuel.

The carburetor 44 has as a part of its continuity the T-fitting 22 and the upper part of the filter 38, all of these parts, the line 18 with its T-fitting 22 and filter 38, are all together to be considered a post-pump second fuel line 60 connecting the discharge side of the fuel pump 34 with the carburetor 44.

The filter 38 can also be called a stand-by filter 38 or a stand-by carburetor protection first fuel filter 38.

The invention further has a by-pass line 66 which includes the upper portion of the T-fitting 22 which is above the post pump line 18, the tube 16, flexible hose 14, a by-pass line or circulating second filter 12, the manual control valve 24, and the tube 28. The by-pass line will be seen to by-pass excess fuel from the post-pump line 60 to fuel tank 32.

It is important that the tube 16 and that portion of the T-fitting 22 to which it is connected take off from the post-pump line 60 in an upward direction to avoid vapor lock.

It will be seen that a constant circulation line generally indicated at 70 is formed by the by-pass line 66 as described, the filler pipe 30, the fuel tank 32, the post-tank line 36, the fuel pump 34, and that portion of the post-pump line 60 which extends to the center of the T-fitting 22.

The constant circulation will be seen to follow the various arrows 80, 82, 84, 86, 88 and 89 in the flow involved in the constant circulation line 70.

It will be seen that the manually controlled valve 24 in the by-pass line as described controls fuel pressure developed by the pump whereby this pressure can be reduced as is normaly desired, the valve 24 being adapted to provide a preset orifice whereby the valve 24 permits fuel pressure at the carburetor 44 to drop to zero pounds when the engine is stopped whereby fuel is not forced into the carburetor 44 (as it is at that time unwanted because of its washing away of lubricant).

It will be seen that the valve 24 is disposed on the fuel tank side in the by-pass line from the filter 12 which shall be called a second filter 12, so that the valve 24 is protected from clogging by the second filter 12.

It will be seen that the by-pass line as above defined is free of any element between its ends which is a part of the by-pass line itself and such as would cause, by itself, a variance in frictional resistance to fuel flow at such element during operation by varying the effective size of the by-pass line. In the sentence preceding, the term "by itself" is used to distinguish from impurities which could clog the circulation filter 12 causing a variance in frictional resistance to fuel flow. To express this in another way and to be more specific, the by-pass line is free in the area between its ends of any spring-loaded and controlled valve causing a variance in frictional resistance to fuel flow during operation by varying the effective size of the by-pass line.

It will be further seen that the by-pass line, as described, is free of any element (such as a spring controlled valve) between its ends causing a fuel pressure in said system to be exerted on the carburetor 44 after the engine has stopped (as is then unwanted because such fuel pressure forces fuel into the cylinders and washes away lubricant from around the cylinder walls).

The filters 12 and 38 are both preferable magnetic filters of conventional construction as they are particularly capable of filtering out iron oxide rust particles.

The reason I prefer not to have a spring-controlled valve in the by-pass line is because such a valve would close by its spring pressure as soon as pumping pressure stopped. This closing would prevent dissipation of unwanted pressure in the post-pump line, a dissipation harmlessly cut off into the by-pass line which is a dissipation which is a desirable feature of this invention and prevents such pressure from getting into the engine after the engine and pump have been turned off where it can there dilute and wash away cylinder wall lubricant.

It will be seen that with the circulation line 70 described, the first fuel filter 38 is not in the circulation line 70, but is, in a sense "up a side stream" in a portion of the post-pump line 60 which is identified in the drawings by the numeral 90 and which shall be called a side stream line 90 for clarity of understanding. The vast bulk of fuel movement is in the circulation line with a flow much greater than goes into the engine through the side stream line 90.

The net results is that the first filter 38 becomes merely a stand-by filter or we can call it a side stream filter 38, to the end that a flow in the direction of the arrow 92 through the side stream stand-by filter 38 is so little in comparison with flow through the circulation filter 12 that the circulation filter 12 can also be called the main filter 12.

The net result is that the stand-by filter 38 will never be clogged so long as the operator takes the precaution of sighting along through the filter pipe from the line 28 to be sure that the flow therefrom is continuous and provided the operator cleans out the main circulating fuel filter 12 whenever stoppage of flow from the line 28 is visible through the open end of filler pipe 30.

For purposes of definition, the lower end of the tube 28 terminates sufficiently close to the openable right end of the filler pipe 30 as to permit visibility of flow from the tube 28.

The term "filler pipe 30" can also include as much of what might be practically considered the other portion of tank 32 as is necessary in order to define the lower outlet of tube 28 as being sufficiently close to the openable right end of the filler pipe 30 as to permit flow from the tube 28 to be seen through the filler pipe 30.

It will be seen that the circulating filter 12 could be positioned anywhere in the circulating line 70, for example, in the post-tank line 36 where it would filter to good advantage, but if in the post-tank line 36, then there would be the disadvantage that clogging of filter 12 when, in line 36, would stop the engine. Whereas clogging of filter 12 when in the by-pass line does not stop the engine and many miles can yet be driven to safety before stand-by side stream filter 38 clogs.

From the foregoing description, it is thought to be obvious that a circulation line and side stream filter fuel system constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

1. A fuel system for an internal combustion engine comprising: a fuel tank, a fuel pump, a carburetor of the float valve controlled input type, a post-tank first fuel line connecting the bottom of said fuel tank with the suction side of said fuel pump, a post-pump second fuel line connecting the discharge side of said pump with said carburetor, a stand-by first fuel filter in said post-pump second line, by-pass fuel line connecting a top portion of said fuel tank with said post-pump second fuel line on the pump side of said stand-by filter, said bypass fuel line providing, when cleaned of impurities, a sufficient frictional resistance to fuel flow therethrough to provide in cooperation with said fuel pump a sufficient operating fuel pressure against said carburetor, whereby said by-pass line, said fuel tank, said post-tank line, said fuel pump, and a portion of said post-pump line all together define a constant circulation fuel line while said pump is operating, a circulating fuel filter in said circulation line, whereby said circulating fuel filter does the greater filtering and said stand-by filter thereby remains more clean as said stand-by filter is not in said circulating fuel line.

2. The combination of claim 1 in which said fuel pump is of the type having a spring-loaded diaphragm and in which the said fuel pressure which is in said post-pump line after said pump and engine are shut off is caused by the tendency of said diaphragm spring to seek its normal relaxed shape.

3. The combination of claim 1 in which said by-pass line, when free of impurities, remains open after said engine and fuel pump are shut off whereby fuel pressure in said post-pump line is dissipated through said by-pass line after said pump has stopped to prevent said pressure from forcing fuel through said carburetor to prevent fuel from excessively diluting and washing away cylinder wall lubrication so that the preserved lubrication can make motor starting easier and preserve motor life.

4. The combination of claim 1 in which said by-pass line has no upper portions disposed above said carburetor and thereby providing an undesired gravity pressure against fuel flow which upper portions are of internal volume substantially greater than necessary for flow of by-pass fuel for constant substantial volume of fuel circulation for filtering such circulating fuel, and also the said cooperation with said fuel pump of said by-pass line flow resistance for providing said sufficient operating pressure being provided substantially by said frictional resistance alone and not to a substantial extent by gravity, whereby there is no substantial quantity of gas to flow down from said by-pass line into said carburetor when said pump and engine have stopped whereby substantial preservation of lubrication in said engine is achieved thereby.

5. A fueling system for an internal combustion engine comprising: a carburetor, a fuel pump, a fuel tank, a first line connecting said fuel pump to said fuel tank, a second line connecting the discharge side of said fuel pump with said carburetor, a by-pass line connecting the second line to the fuel tank, a first filter in said second line and disposed on the carburetor side of the connection between said second and by-pass lines, a second filter in said by-pass line, a manually controllable valve in said by-pass line for controlling fuel pressure developed by said pump, said valve being adapted to provide a pre-set orifice whereby said valve permits fuel pressure at said carburetor to drop to zero pounds when said engine is stopped whereby fuel is not forced into said carburetor as is then unwanted because of its washing away of lubricant around the cylinder walls.

6. The combination of claim 5 in further combination with: said valve being disposed on the fuel tank side in said by-pass line from said second filter where said valve is protected from clogging by said second filter.

7. A fueling system for an internal combustion engine comprising: a carburetor, a fuel pump, a fuel tank, a first line connecting said fuel pump to said fuel tank, a second line connecting the discharge side of said fuel pump with said carburetor, a by-pass line connecting the second line to the fuel tank, a first filter in said second line and disposed on the carburetor side of the connection between said second and by-pass lines, a second filter in said by-pass line, a manually controllable valve in said by-pass line for controlling fuel pressure developed by said pump, said valve being adapted to provide a pre-set orifice whereby said valve permits fuel pressure at said carburetor to drop to zero pounds when said engine is stopped whereby fuel is not forced into said carburetor as is then unwanted because of its washing away of lubricant around the cylinder walls, said by-pass line being free of any element between its ends causing a fuel pressure in said system to be exerted on said carburetor after said engine has stopped.

8. A fueling system has an internal combustion engine comprising: a carburetor, a fuel pump, a fuel tank, a first line connecting said fuel pump to said fuel tank, a second line connecting the discharge side of said fuel pump with said carburetor, a by-pass line connecting the second line to the fuel tank, a first filter in said second line and disposed on the carburetor side of the connection between said second and by-pass lines, a second filter in said by-pass line, a manually controllable valve in said by-pass line for controlling fuel pressure developed by said pump, said valve being adapted to provide a pre-set orifice whereby said valve permits fuel pressure at said carburetor to drop to zero pounds when said engine is stopped whereby fuel is not forced into said carburetor as is then unwanted because of its washing away of lubricant around the cylinder walls, said by-pass line being free between its ends of any spring loaded and controlled valve causing a variance in frictional resistance to fuel flow during operation by varying the size of said by-pass line.

9. A fueling system for an internal combustion engine comprising: a carburetor, a fuel pump, a fuel tank, a first fuel line connecting the suction side of said fuel pump with the bottom of said fuel tank, a second fuel line connecting the discharge side of said fuel pump with the carburetor, a first fuel filter in said second fuel line, a by-pass fuel line connecting said second fuel line with the top of said fuel tank, said by-pass connection being made on the fuel pump side of said first fuel filter, a part of said by-pass line being flexible, a second fuel filter in said by-pass fuel line, an adjustable orifice in said by-pass fuel line, said by-pass line being free of any element between its ends which is a part of the by-pass line itself and which, by itself, causes a fuel pressure in said system to be exerted on said carburetor after said engine has stopped, these component parts being operatively correlated to provide increased fuel circulation by effective sediment removal to produce multiple filtered fuel for the carburetor, to provide adjustable fuel pressure to the carburetor while the motor is running and no fuel pressure while the motor is stopped, to eliminate vapor lock and to increase the removal of sediments from said fuel tank.

10. The combination of claim 1 in which said fuel tank has a conventional filler pipe having an openable filling end and in which the outlet end of said by-pass fuel line is connected to said filler pipe sufficiently close to its outlet end as to permit visibility of flow into said filler pipe from said by-pass line, whereby stoppage of such flow and need to clean out said circulating filter can quickly be detected.

11. The combination of claim 1 in which a portion of said by-pass line is flexible to absorb vibrations.

References Cited in the file of this patent

UNITED STATES PATENTS

| | | |
|---|---|---|
| 2,720,313 | Pattison | Oct. 11, 1955 |
| 2,795,269 | Witte | June 11, 1957 |
| 2,818,111 | Ross | Dec. 31, 1957 |

FOREIGN PATENTS

| | | |
|---|---|---|
| 445,724 | Great Britain | Apr. 17, 1936 |
| 818,922 | Great Britain | Aug. 26, 1959 |

OTHER REFERENCES

"American-Bosch Fuel Injection Equipment for Diesel Engines" (G. W. Baierlein), published by United American Bosch Corporation (Springfield, Mass.) 1937 (pages 19 and 30, particularly Figures 28 and 55, relied on).